No. 677,099. Patented June 25, 1901.
J. H. NUNN.
DETACHABLE COVERING FOR BRIDLE BITS.
(Application filed Feb. 20, 1901.)
(No Model.)

Witnesses:
George Barry Jr
Henry Thieme

Inventor:-
John Hancock Nunn
By his attorneys
Brown & Seward

UNITED STATES PATENT OFFICE.

JOHN HANCOCK NUNN, OF LONDON, ENGLAND.

DETACHABLE COVERING FOR BRIDLE-BITS.

SPECIFICATION forming part of Letters Patent No. 677,099, dated June 25, 1901.

Application filed February 20, 1901. Serial No. 48,072. (No model.)

*To all whom it may concern:*

Be it known that I, JOHN HANCOCK NUNN, (trading as James Lyne Hancock, india-rubber manufacturer,) a subject of the King of Great Britain, residing at 266 Goswell road, London, England, have invented new and useful Improvements in Detachable Coverings for Bridle-Bits, of which the following is a specification.

This invention has reference to detachable rubber covers for the mouthpieces of bridle-bits for horses.

These detachable rubber covers are usually made from uncured rubber sheet rolled up into cylindrical form upon a core and then vulcanized, so that their tendency will be to remain rolled up when placed around the mouthpiece of the bit. It is found in practice, however, that this tendency to remain rolled up is not sufficiently strong and the covers occasionally in consequence come off the bit when in use. To avoid this contingency, the rubber sheet is according to my invention specially reinforced during manufacture by incorporating between two sheets of uncured rubber a sheet of elastic textile material, such as stockinette, the whole compound sheet being rolled up upon a mandrel and vulcanized without producing the adhesion of the contiguous rolled layers or convolutions of the incorporated or compound sheet.

Figure 1:
Figure 2:
Figure 3:
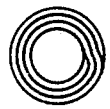

In the accompanying drawings, Figure 1 shows a piece of compound sheet for making a bit-cover. Figs. 2 and 3 show in outside and end views a bit-cover made from the said sheet.

$a$ and $b$ are the rubber sheets, and $c$ is the textile fabric embedded between them, the three sheets forming a compound sheet. A piece of this compound sheet of suitable size having been taken, it is rolled upon a core, with talc powder or its equivalent dusted between the convolutions, and the whole is vulcanized in the rolled-up state, the said powder preventing the convolutions of the compound sheet from adhering together in the vulcanizing process. After vulcanization the two outer sheets of rubber appear to coöperate with one another and with the elastic textile fabric embedded between them to keep the mouthpiece-cover rolled up in the form shown in Figs. 2 and 3, so that there will be no tendency for it to come off the bit accidentally when in use.

I claim—

A detachable cover for bridle-bits consisting of a compound sheet which embodies two sheets of rubber and an interposed reinforcing-sheet of elastic textile fabric and which is rolled up and vulcanized with the rubber surfaces of its contiguous convolutions nonadherent, substantially as herein described.

In testimony whereof I have signed my name to this specification in the presence of two subscribing witnesses.

JNO. HANCOCK NUNN.

Witnesses:
ALFRED S. BISHOP,
L. M. REDDIE.